United States Patent
Chen et al.

(10) Patent No.: US 10,418,158 B1
(45) Date of Patent: Sep. 17, 2019

(54) COMPOSITE CIRCUIT PROTECTION DEVICE

(71) Applicant: FUZETEC TECHNOLOGY CO., LTD., New Taipei (TW)

(72) Inventors: Jack Jih-Sang Chen, New Taipei (TW); Chang-Hung Jiang, New Taipei (TW)

(73) Assignee: FUZETEC TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 15/964,877

(22) Filed: Apr. 27, 2018

(51) Int. Cl.
| | |
|---|---|
| *H01C 7/12* | (2006.01) |
| *H01C 7/02* | (2006.01) |
| *H01C 1/14* | (2006.01) |
| *C08L 23/06* | (2006.01) |
| *C08L 51/06* | (2006.01) |
| *H01C 1/028* | (2006.01) |

(52) U.S. Cl.
CPC ............... *H01C 7/12* (2013.01); *C08L 23/06* (2013.01); *C08L 51/06* (2013.01); *H01C 1/028* (2013.01); *H01C 1/1406* (2013.01); *H01C 7/028* (2013.01); *C08L 2203/20* (2013.01); *C08L 2207/062* (2013.01)

(58) Field of Classification Search
CPC ........ H01C 7/12; H01C 1/028; H01C 1/1406; H01C 7/028; C08L 23/06
See application file for complete search history.

(56) References Cited

U.S. PATENT DOCUMENTS

| | | | | |
|---|---|---|---|---|
| 4,545,926 A * | 10/1985 | Fouts, Jr. | ............... | H01C 7/027 252/502 |
| 6,700,766 B2 * | 3/2004 | Sato | ................. | H02H 9/042 361/93.1 |
| 8,446,245 B2 * | 5/2013 | Wang | ................. | H01C 7/027 252/500 |
| 8,508,328 B1 * | 8/2013 | Chen | ................. | H01C 7/028 338/13 |
| 2006/0197646 A1 * | 9/2006 | Suzuki | ................. | H01C 1/1406 337/167 |
| 2007/0025044 A1 * | 2/2007 | Golubovic | ............. | H01C 7/102 361/124 |
| 2007/0170831 A1 * | 7/2007 | Sato | ................. | H01C 1/1406 313/11 |
| 2015/0155080 A1 * | 6/2015 | Chu | ................. | H01C 1/1406 338/22 R |

* cited by examiner

*Primary Examiner* — Kyung S Lee
(74) *Attorney, Agent, or Firm* — LeClairRyan

(57) ABSTRACT

A composite circuit protection device includes a polymer positive temperature coefficient (PPTC) component, a voltage-dependent resistor, a first conductive lead and a second conductive lead. The PPTC component is formed with a hole and includes a positive temperature coefficient (PTC) polymeric layer, and first and second electrode layers respectively disposed on two opposite surfaces of the PTC polymeric layer. The hole is formed in the PTC polymeric layer. The voltage-dependent resistor is connected to the second electrode layer of the PPTC component. The first and second conductive leads are respectively bonded to the first electrode layer of the PPTC component and the voltage-dependent resistor.

18 Claims, 7 Drawing Sheets

COMPOSITE CIRCUIT PROTECTION DEVICE

FIELD

The disclosure relates to a composite circuit protection device, and more particularly to a composite circuit protection device having a voltage-dependent resistor and a polymer positive temperature coefficient (PPTC) component with a hole.

BACKGROUND

U.S. Pat. No. 8,508,238 B1 discloses an insertable polymer positive temperature coefficient (PPTC) over-current protection device that includes first and second electrodes 30; a solder material; conductive lead pins 50, 60 bonded to the first and second electrodes 30, respectively, and a PTC polymer matrix 20 laminated between the first and second electrodes 30 (see FIG. 1). The PTC polymer matrix 20 is formed with at least one hole 40 that has an effective volume to accommodate thermal expansion of the PTC polymer matrix 20 when the temperature of the PTC polymer matrix 20 is increased.

Electrical properties (e.g., operating current and high-voltage surge endurability) are important factors in the PPTC over-current protection device for preventing power surge. When the operating current of the PPTC over-current protection device is increased by increasing the thickness or the area of the PTC polymer matrix 20, it may become more vulnerable to power surge. On the other hand, when the high-voltage endurability of the PPTC over-current protection device is increased by decreasing the thickness or the area of the PTC polymer matrix 20, the PPTC over-current protection device is not necessarily less vulnerable to power surge.

SUMMARY

Therefore, an object of the disclosure is to provide a composite circuit protection device that can alleviate at least one of the drawbacks of the prior art.

According to the disclosure, a composite circuit protection device includes a polymer positive temperature coefficient (PPTC) component, a voltage-dependent resistor, a first conductive lead and a second conductive lead. The PPTC component is formed with a hole and includes a positive temperature coefficient (PTC) polymeric layer having two opposite surfaces, and first and second electrode layers respectively disposed on the two opposite surfaces of the PTC polymeric layer. The hole is formed in the PTC polymeric layer. The voltage-dependent resistor is connected to the second electrode layer of the PPTC component. The first conductive lead is bonded to the first electrode layer of the PPTC component and the second conductive lead is bonded to the voltage-dependent resistor.

BRIEF DESCRIPTION OF THE DRAWINGS

Other features and advantages of the present disclosure will become apparent in the following detailed description of the embodiment with reference to the accompanying drawing, of which.

DETAILED DESCRIPTION

Figure 1:
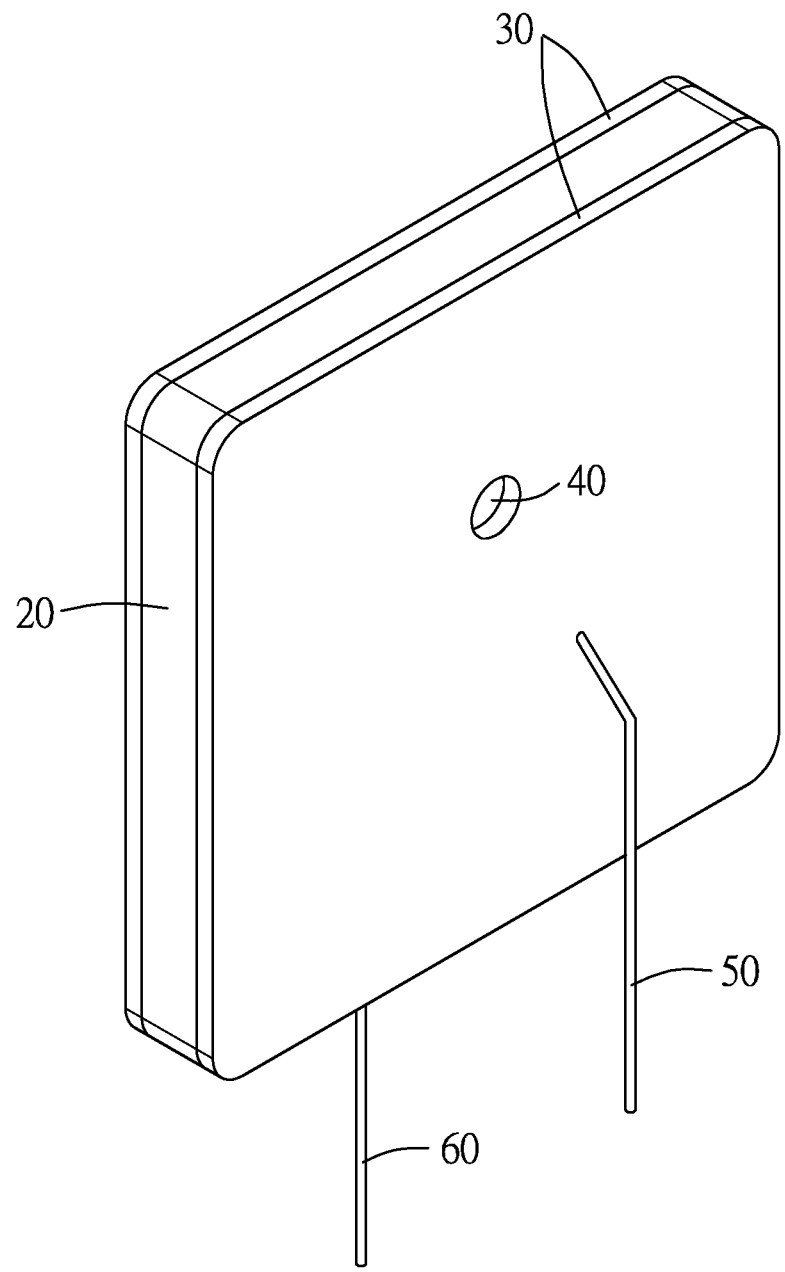
FIG. 1 is a perspective view of a conventional insertable PPTC over-current protection device.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
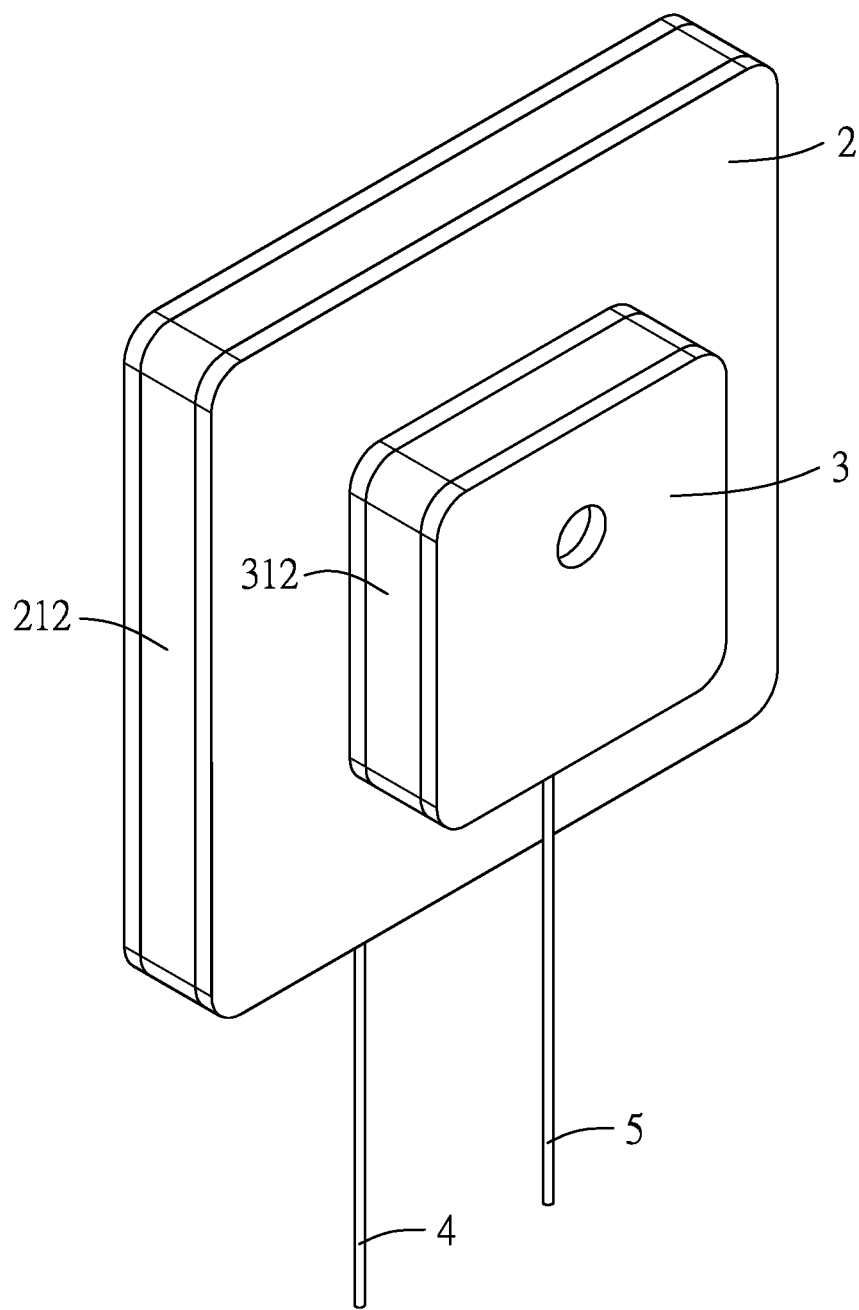
FIG. 2 is a perspective view of a first embodiment of a composite circuit protection device according to the present disclosure.
Figure 3:
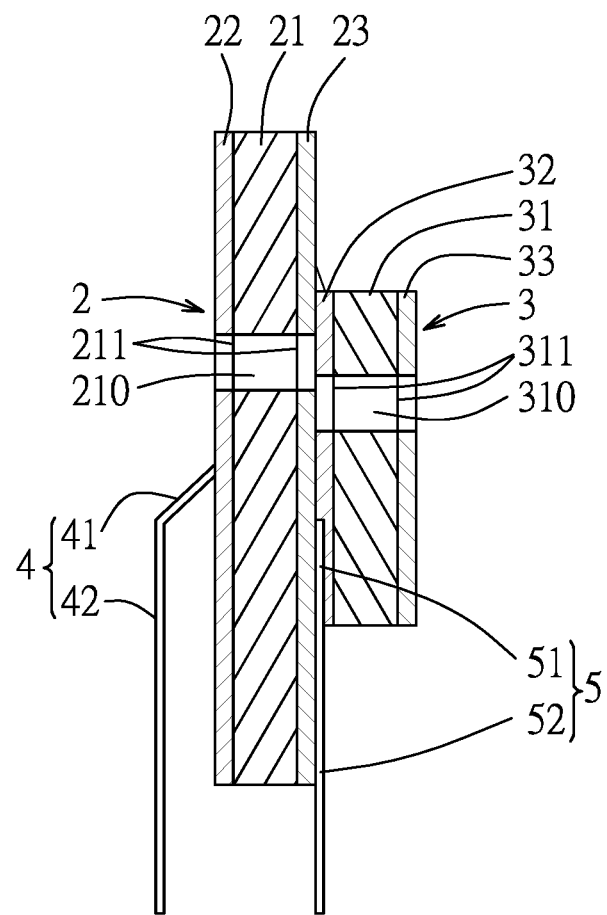
FIG. 3 is a schematic sectional view of the first embodiment.

Referring to FIGS. 2 and 3, a first embodiment of a composite circuit protection device according to the present disclosure includes a polymer positive temperature coefficient (PPTC) component 2, a voltage-dependent resistor 3, a first conductive lead 4 and a second conductive lead 5. The PPTC component 2 is formed with a first hole 210 and includes a positive temperature coefficient (PTC) polymeric layer 21 having two opposite surfaces 211, and first and second electrode layers 22, 23 respectively disposed on the two opposite surfaces 211 of the PTC polymeric layer 21. The voltage-dependent resistor 3 is connected to the second electrode layer 23 of the PPTC component 2 through a solder material. The first conductive lead 4 is bonded to the first electrode layer 22 of the PPTC component 2 and the second conductive lead 5 is bonded to the voltage-dependent resistor 3. The first hole 210 is formed in the PTC polymeric layer 21. The PTC polymeric layer 21 of the PPTC component 2 has a peripheral edge 212 that defines a boundary of the PTC polymeric layer 21 and interconnects the two opposite surfaces 211 of the PTC polymeric layer 21. The first hole 210 is spaced apart from the peripheral edge 212, and has an effective volume to accommodate thermal expansion of the PTC polymeric layer 21 when the temperature of the PTC polymeric layer 21 is increased, so as to avoid undesired structural deformation of the PTC polymeric layer 21.

In certain embodiments, the first hole 210 extends through at least one of the two opposite surfaces 211 of the PTC polymeric layer 21. In certain embodiments, the first hole 210 further extends through at least one of the first and second electrode layers 22, 23. In this embodiment, the first hole 210 extends through the two opposite surfaces 211 of the PTC polymeric layer 21 and the first and second electrode layers 22, 23, so as to form a through hole. In certain embodiments, the first hole 210 extends along a line passing through a geometrical center of the PTC polymeric layer 21 and transverse to the opposite surfaces 211 of the PTC polymeric layer 21. The hole 210 is defined by a hole-defining wall which has a cross section parallel to the surface 211 of the PTC polymeric layer 21. The cross section of the hole-defining wall is in a shape of circle, square, oval, triangle, crisscross, or etc.

According to the disclosure, the voltage-dependent resistor 3 includes a voltage-dependent resistor layer 31 having two opposite surfaces 311, and third and fourth electrode layers 32, 33. The third electrode layer 32 is disposed on one of the two opposite surfaces 311 of the voltage-dependent resistor layer 31 and is connected to the second electrode layer 23 of the PPTC component 2, while the fourth electrode layer 33 is disposed on the other one of the two opposite surfaces 311 of the voltage-dependent resistor layer 31. In certain embodiments, the voltage-dependent resistor layer 31 is made from a metal-oxide material. The second conductive lead 5 is bonded to one of the third and fourth electrode layers 32, 33 of the voltage-dependent resistor 3. In this embodiment, the second conductive lead 5 is bonded to and disposed between the second and third electrode layers 23, 32.

The voltage-dependent resistor layer 31 of the voltage-dependent resistor 3 has a peripheral edge 312 that defines a boundary of the voltage-dependent resistor layer 31 and interconnects the two opposite surfaces 311 of the voltage-dependent resistor layer 31.

The voltage-dependent resistor 3 is formed with a second hole 310 in the voltage-dependent resistor layer 31. The second hole 310 is spaced apart from the peripheral edge 312 of the voltage-dependent resistor layer 31. In certain embodiments, the second hole 310 extends through at least one of the two opposite surfaces 311 of the voltage-dependent resistor layer 31. In certain embodiments, the second hole 310 further extends through at least one of the third and fourth electrode layers 32, 33. In this embodiment, the second hole 310 extends through the two opposite surfaces 311 of the voltage-dependent resistor layer 31 and the third and fourth electrode layers 32, 33, so as to form a through hole.

According to the present disclosure, the first conductive lead 4 has a connecting portion 41 and a free portion 42, while the second conductive lead 5 has a connecting portion 51 and a free portion 52. The connecting portion 41 of the first conductive lead 4 is bonded to an outer surface of the first electrode layer 22 of the PPTC component 2 through a solder material, and the free portion 42 extends outwardly from the connecting portion 41 beyond the first electrode layer 22 for insertion into a pin hole in a circuit board or a circuit device (not shown in the drawings). In this embodiment, the connecting portion 51 of the second conductive lead 5 is bonded to and disposed between the second and third electrode layers 23, 32 through a solder material, and the free portion 52 extends outwardly from the connecting portion 51 beyond the second and third electrode layers 23, 32 for insertion into a pin hole in a circuit board or a circuit device (not shown in the drawings).

According to the present disclosure, the PTC polymeric layer 21 of the PPTC component 2 includes a polymer matrix and a conductive filler dispersed in the polymer matrix. The polymer matrix 21 is made from a polymer composition that contains a non-grafted olefin-based polymer. In certain embodiments, the non-grafted olefin-based polymer is high density polyethylene (HDPE). In certain embodiments, the polymer composition of the polymer matrix 21 further includes a grafted olefin-based polymer. In certain embodiments, the grafted olefin-based polymer is carboxylic acid anhydride-grafted olefin-based polymer. Examples of the conductive filler suitable for use in this disclosure include, but are not limited to, carbon black powder, metal powder, electrically conductive ceramic powder, and combinations thereof.

Figure 4:
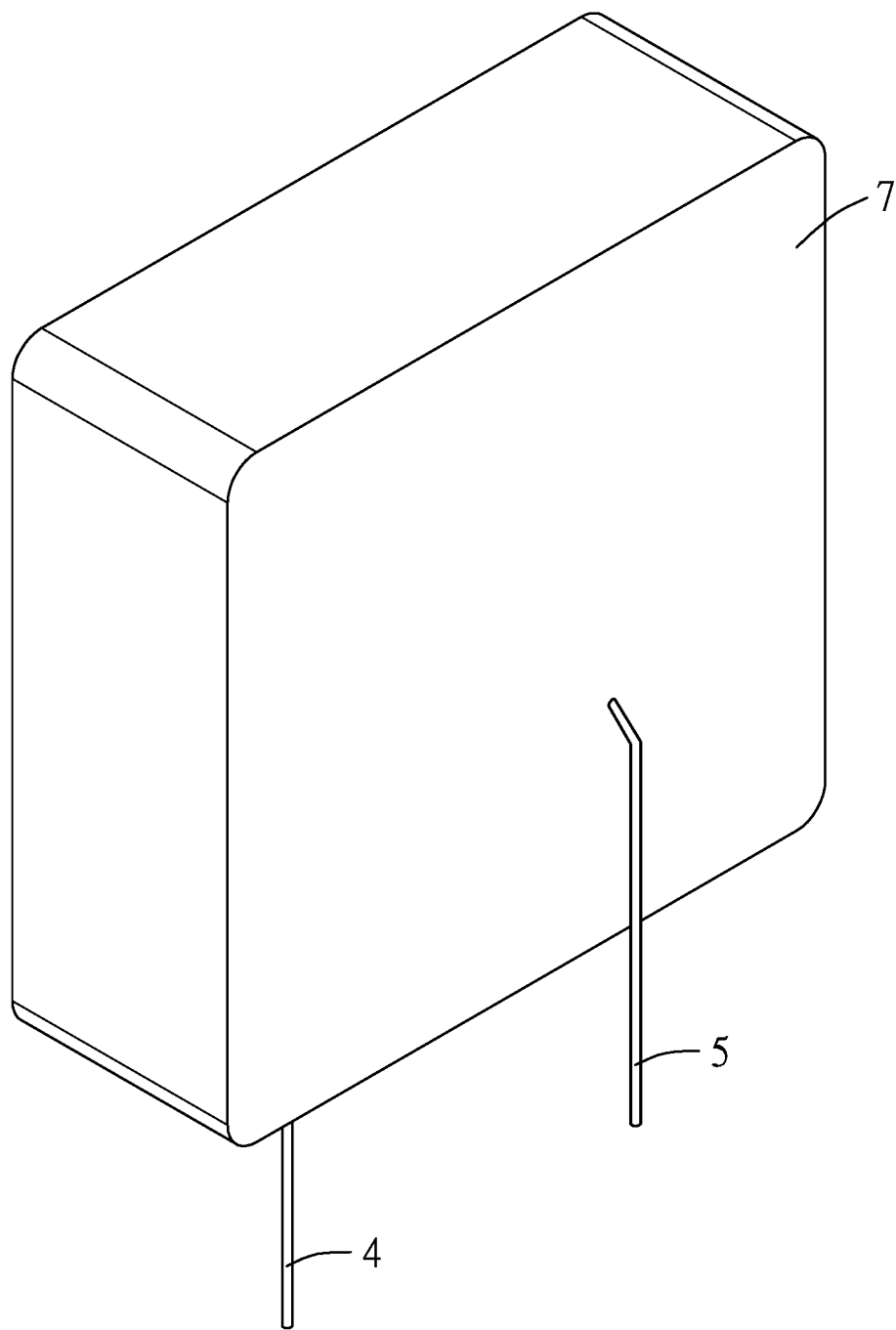
FIG. 4 is a perspective view of a second embodiment of a composite circuit protection device according to the present disclosure.
Figure 5:
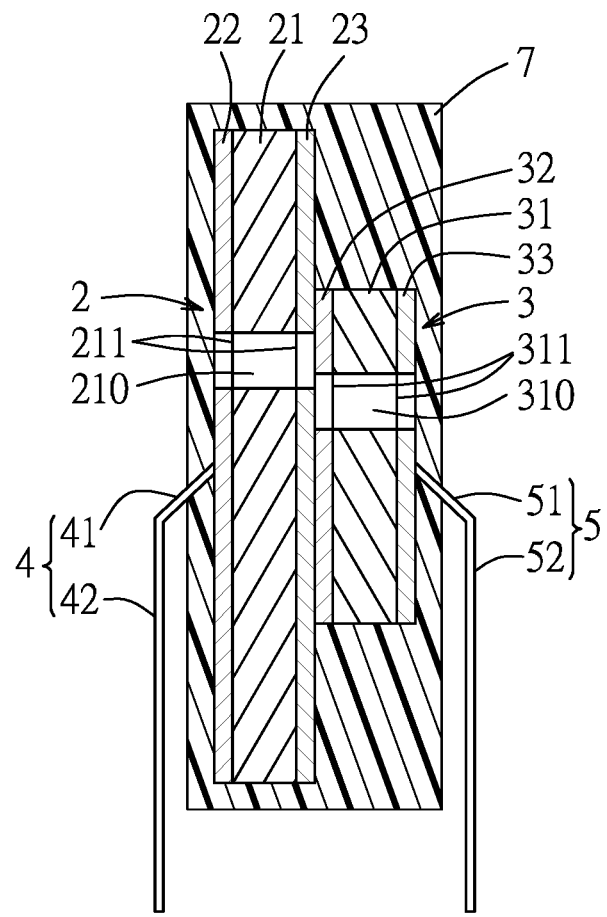
FIG. 5 is a schematic sectional view of the second embodiment.

Referring to FIGS. 4 and 5, a second embodiment of a composite circuit protection device according to the present disclosure is similar to the first embodiment. The difference resides in that, in the second embodiment, the connecting portion 51 of the second conductive lead 5 is bonded to an outer surface of the fourth electrode layer 33 of the voltage-dependent resistor 3 through a solder material, and the free portion 52 extends outwardly from the connecting portion 51 beyond the fourth electrode layer 33 for insertion into a pin hole in a circuit board or a circuit device (not shown in the drawings).

In this embodiment, the composite circuit protection device of this disclosure further includes an encapsulant 7 that encloses the PPTC component 2, the voltage-dependent resistor 3, a part of the first conductive lead 4 and a part of the second conductive lead 5. The free portions 42, 52 of the first conductive lead 4 and the second conductive lead 5 are exposed from the encapsulant 7. In certain embodiments, the encapsulant 7 is made from epoxy resin.

Figure 6:
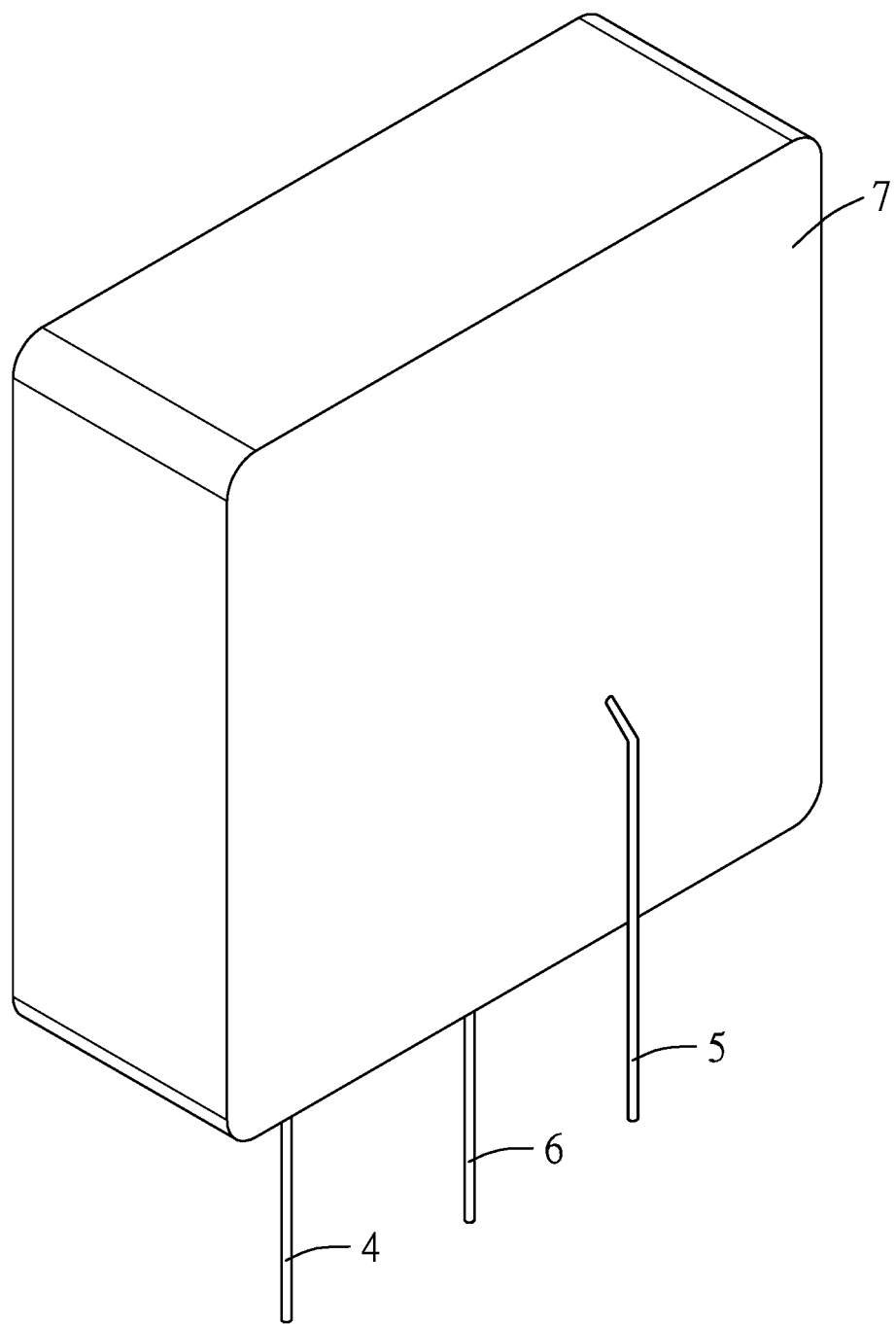
FIG. 6 is a perspective view of a third embodiment of a composite circuit protection device according to the present disclosure.
Figure 7:
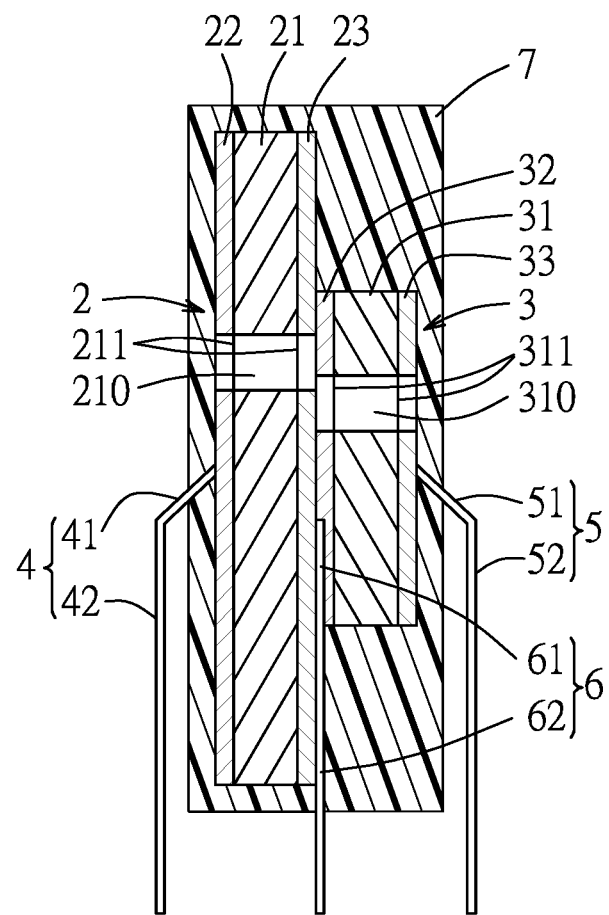
FIG. 7 is a schematic sectional view of the third embodiment.

Referring to FIGS. 6 and 7, a third embodiment of a composite circuit protection device according to the present disclosure is similar to the second embodiment except that the composite circuit protection device of the third embodiment further includes a third conductive lead 6. The third conductive lead 6 is bonded to and disposed between the second and third electrode layers 23, 32. The third conductive lead 6 has a connecting portion 61 connected to the second and third electrode layers 23, 32, and a free portion 62 extends outwardly from the connecting portion 61 beyond the second and third electrode layers 23, 32 for insertion into a pin hole in a circuit board or a circuit device (not shown in the drawings).

In this embodiment, the encapsulant 7 encloses the PPTC component 2, the voltage-dependent resistor 3, a part of the first conductive lead 4, a part of the second conductive lead 5, and a part of the third conductive lead 6. The free portions 42, 52, 62 of the first, second and third conductive leads 4, 5, 6 are exposed from the encapsulant 7.

The disclosure will be further described by way of the following examples and comparative examples. However, it should be understood that the following examples are solely intended for the purpose of illustration and should not be construed as limiting the disclosure in practice.

EXAMPLES

Example 1 (E1)

10 grams of HDPE (polymer 1, purchased from Formosa Plastics Corp., catalog no.: HDPE9002) serving as the non-grafted olefin-based polymer, 10 grams of maleic anhydride grafted HDPE (purchased from Dupont, catalog no.: MB100D) serving as the carboxylic acid anhydride-grafted olefin-based polymer, 15 grams of carbon black powder (purchased from Columbian Chemicals Co., catalog no.: Raven 430UB), and 15 grams of magnesium hydroxide (MagChem® MH 10) were compounded in a Brabender mixer. The compounding temperature was 200° C., the stirring rate was 30 rpm, and the compounding time was 10 minutes.

The compounded mixture was hot pressed in a mold so as to form a thin sheet of the PTC polymeric layer having a thickness of 2.25 mm. The hot pressing temperature was 200° C., the hot pressing time was 4 minutes, and the hot pressing pressure was 80 kg/cm$^2$.

Two copper foil sheets (serving as the first electrode layer and the second electrode layer, respectively) were respectively attached to the two opposite surfaces of the PTC polymeric layer and were hot pressed under 200° C. and 80 kg/cm² for 4 minutes to form a sandwiched structure of a PTC laminate. The PTC laminate was cut into a plurality of PTC samples with a size of 14.5 mm×14.5 mm. Each PTC sample was irradiated with a Cobalt-60 gamma ray for a total irradiation dose of 150 kGy, and was subsequently punched to form a circular through-hole (having a diameter (d) of 1.5 mm and a hole area ($\Pi d^2/4$) of 1.77 mm²) in a central portion of the PTC sample. First and second conductive leads were then welded to the copper foil sheets of each PTC sample, respectively, followed by welding of a voltage-dependent resistor (Centra Science Corp., Model No: 14S431KA) to one of the copper foil sheets of the PTC sample, so as to form a composite circuit protection device as shown in FIGS. 2 and 3.

Examples

Examples 2 to 3 (E2 to E3)

The procedures and conditions in preparing the composite circuit protection devices of E2 to E3 were similar to those of E1 except for the positions and/or the number of the conductive leads. To be specific, in E2, the voltage-dependent resistor was welded to the PTC sample, followed by welding the first and second conductive leads to outer surfaces of the PTC sample and the voltage-dependent resistor, respectively, so as to form the composite circuit protection devices of E2 as shown in FIGS. 4 and 5. In E3, the first and second conductive leads were welded to outer surfaces of the PTC sample and the voltage-dependent resistor, respectively, and the third conductive lead was bonded to and disposed between the PTC sample and the voltage-dependent resistor. Therefore, the composite circuit protection device of E3 has a structure shown in FIGS. 6 and 7.

Examples 4 to 6 (E4 to E6)

The structure of the composite circuit protection devices of E4 to E6 were respectively similar to those of E1 to E3, except that a circular through hole is also formed in the voltage-dependent resistor (having a diameter (d) of 1.5 mm and a hole area ($\Pi d^2/4$) of 1.77 mm²) (see Table 1).

Comparative Examples 1 to 2 (CE1 to CE2)

The procedures and conditions in preparing the composite circuit protection devices of CE1 and CE2 were similar to those of E1 except that, the voltage-dependent resistor was not included in CE1 and CE2, the composite circuit protection device of CE1 has a PTC polymeric layer formed without a hole, and the composite circuit protection device of CE2 has a PTC polymeric layer formed with a hole (having a size and a position the same as those in E1).

Comparative Examples 3 to 5 (CE3 to CE5)

The procedures and conditions in preparing the composite circuit protection devices of CE3 to CE5 were similar to those of E4 to E6 except that, in CE3 to CE5, each of the PTC polymeric layer and the voltage-dependent resistor are not formed with a hole.

The structure of the composite circuit protection devices of E1 to E6 and CE1 to CE5 are summarized in Table 1, where V is an indicator for existence.

TABLE 1

| | Composite circuit protection device | | | |
|---|---|---|---|---|
| | PTC polymeric layer | Hole (210) | Voltage-dependent resistor | Hole (310) |
| E1 | V | V | V | |
| P2 | V | V | V | |
| E3 | V | V | V | |
| E4 | V | V | V | V |
| E5 | V | V | V | V |
| E6 | V | V | V | V |
| C1 | V | | | |
| C2 | V | V | | |
| C3 | V | | V | |
| C4 | V | | V | |
| C5 | V | | V | |

Performance Test

Hold Current Test

The composite circuit protection devices of E1 to E6 and CE1 to CE5, serving as test samples, were subjected to a hold current test to determine the maximal operate current of the test samples.

The hold current test was conducted under 240 Vac for 15 minutes without causing it to trip under 25° C. The results are shown in Table 2.

TABLE 2

| | Hold current test Maximal operate current (A) | Surge immunity test 400 Vac | | | Surge immunity test 600 Vac | | |
|---|---|---|---|---|---|---|---|
| | | 10 A, 1 min Passing rate (%) | 15 A, 1 min Passing rate (%) | 20 A, 1 min Passing rate (%) | 3 A, 1 min Passing rate (%) | 7 A, 1 min Passing rate (%) | 40 A, 5 sec Passing rate (%) |
| E1 | 1.2 | 100 | 100 | 100 | 100 | 100 | 100 |
| E2 | 1.2 | 100 | 100 | 100 | 100 | 100 | 100 |
| E3 | 1.2 | 100 | 100 | 100 | 100 | 100 | 100 |
| E4 | 1.4 | 100 | 100 | 100 | 100 | 100 | 100 |
| E5 | 1.4 | 100 | 100 | 100 | 100 | 100 | 100 |
| E6 | 1.4 | 100 | 100 | 100 | 100 | 100 | 100 |
| C1 | 0.8 | 50 | 30 | 20 | 50 | 20 | 10 |
| C2 | 0.9 | 60 | 50 | 50 | 70 | 50 | 20 |

TABLE 2-continued

| | Hold current test Maximal operate current (A) | Surge immunity test 400 Vac | | | Surge immunity test 600 Vac | | |
|---|---|---|---|---|---|---|---|
| | | 10 A, 1 min Passing rate (%) | 15 A, 1 min Passing rate (%) | 20 A, 1 min Passing rate (%) | 3 A, 1 min Passing rate (%) | 7 A, 1 min Passing rate (%) | 40 A, 5 sec Passing rate (%) |
| C3 | 0.9 | 60 | 60 | 60 | 50 | 50 | 20 |
| C4 | 0.9 | 60 | 60 | 60 | 50 | 40 | 20 |
| C5 | 0.9 | 60 | 50 | 60 | 40 | 40 | 20 |

The results reveal that, the maximal operate current of the test samples of each of E1 to E6 was between 1.2 A and 1.4 A, while the maximal operate current for CE1 to CE5 was 0.8 A to 0.9 A.

It is evident that formation of the hole in the PTC polymeric layer and connection of the PPTC component to the voltage-dependent resistor would increase the maximal operate current of the composite circuit protection devices of the examples by 20% as compared to the test samples of CE1 to CE5.

Surge Immunity Test at 400 Vac

Ten of the composite circuit protection devices of each of E1 to E6 and CE1 to CE5, serving as test samples, were subjected to a surge immunity test.

The surge immunity test for each test sample was conducted under a fixed voltage of 400 Vac and different currents of 10 A, 15 A and 20 A in a sequential manner, by switching on for 60 seconds and then off for each tested current. The number (n) of the test samples for each of E1 to E6 and CE1 to CE5 passing the test without being burnt out and damaged was recorded, and a passing rate (n/10× 100%) for each of E1 to E6 and CE1 to CE5 was calculated. The surge immunity test results are shown in Table 2.

The test results reveal that, the passing rate of test samples of each of E1 to E6 was 100%, while the passing rates for the test samples of each of CE1 to CE5 were between 20% and 60%.

It is evident that formation of the hole in the PTC polymeric layer and connection of the PPTC component to the voltage-dependent resistor would improve the surge protection capacity of the composite circuit protection device.

Surge Immunity Test at 600 Vac

Ten of the composite circuit protection devices of each of E1 to E6 and CE1 to CE5, serving as test samples, were subjected to a surge immunity test.

The surge immunity test for each test sample was conducted under a fixed voltage of 600 Vac and different currents of 3 A, 7 A and 40 A in a sequential manner. To be specific, the test sample was switched on for 60 seconds and then off at each of 3 A and 7 A, and subsequently switched on for 5 seconds at 40 A and then off. The number (n) of the test samples for each of E1 to E6 and CE1 to CE5 passing the test without being burnt out and damaged was recorded, and a passing rate (n/10×100%) for each of E1 to E6 and CE1 to CE5 was calculated. The surge immunity test results are shown in Table 2.

The test results reveal that, the passing rate of test samples of each of E1 to E6 was 100%, while the passing rates for these test samples of each of CE1 to CE5 were between 10% and 70%. For test samples of CE1 to CE5, the passing rate was lower than the test samples of each of E1 to E6 due to some of the composite circuit protection devices being burnt out and damaged in the surge immunity test.

It is evident that formation of the hole in the PTC polymeric layer and connection of the PPTC component to the voltage-dependent resistor would improve the surge protection capacity of the composite circuit protection device.

In conclusion, by having the PTC polymeric layer formed with the hole and is bonded to the voltage-dependent resistor formed with or without the hole, the composite circuit protection device of this disclosure passes the surge immunity test and has a relatively high maximal operate current, and thus exhibits good endurability and reliability.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A composite circuit protection device, comprising:
   a polymer positive temperature coefficient (PPTC) component that is formed with a first hole and that includes
      a positive temperature coefficient (PTC) polymeric layer having two opposite surfaces, said first hole being formed in said PTC polymeric layer, and
      first and second electrode layers respectively disposed on said two opposite surfaces of said PTC polymeric layer;
   a voltage-dependent resistor that is formed with a second hole and connected to said second electrode layer of said PPTC component;

a first conductive lead that is bonded to said first electrode layer of said PPTC component; and
a second conductive lead that is bonded to said voltage-dependent resistor;
wherein said voltage-dependent resistor includes
a voltage-dependent resistor layer having two opposite surfaces, and
a third electrode layer disposed on one of said two opposite surfaces of said voltage-dependent resistor layer and connected to said second electrode layer of said PPTC component, and
a fourth electrode layer disposed on the other one of said two opposite surfaces of said voltage-dependent resistor layer, and
wherein said second conductive lead is bonded to one of said third and fourth electrode layers of said voltage-dependent resistor.

2. The composite circuit protection device of claim 1, further comprising a third conductive lead, said second conductive lead bonded to said fourth electrode layer, said third conductive lead bonded to and disposed between said second and third electrode layers.

3. The composite circuit protection device of claim 1, wherein said PTC polymeric layer of said PPTC component has a peripheral edge defining a boundary of said PTC polymeric layer and interconnecting said two opposite surfaces of said PTC polymeric layer, said first hole being spaced apart from said peripheral edge of said PTC polymeric layer.

4. The composite circuit protection device of claim 1, wherein said first hole extends through at least one of said two opposite surfaces of said PTC polymeric layer.

5. The composite circuit protection device of claim 4, wherein said first hole further extends through at least one of the first and second electrode layers.

6. The composite circuit protection device of claim 1, wherein said second hole is formed in the voltage-dependent resistor layer.

7. The composite circuit protection device of claim 6, wherein said voltage-dependent resistor layer of said voltage-dependent resistor has a peripheral edge defining a boundary of said voltage-dependent resistor layer and interconnecting said two opposite surfaces of said voltage-dependent resistor layer, said second hole being spaced apart from said peripheral edge of said voltage-dependent resistor layer.

8. The composite circuit protection device of claim 6, wherein said second hole extends through at least one of said two opposite surfaces of said voltage-dependent resistor layer.

9. The composite circuit protection device of claim 6, wherein said second hole further extends through at least one of said third and fourth electrode layers.

10. The composite circuit protection device of claim 1, wherein said PTC polymeric layer of said PPTC component includes a polymer matrix and a conductive filler dispersed in said polymer matrix.

11. The composite circuit protection device of claim 10, wherein said polymer matrix is made from a polymer composition containing a non-grafted olefin-based polymer.

12. The composite circuit protection device of claim 11, wherein said non-grafted olefin-based polymer is high density polyethylene.

13. The composite circuit protection device of claim 11, wherein said polymer composition further includes a grafted olefin-based polymer.

14. The composite circuit protection device of claim 13, wherein said grafted olefin-based polymer is carboxylic acid anhydride-grafted olefin-based polymer.

15. The composite circuit protection device of claim 10, wherein said conductive filler is selected from the group consisting of carbon black powder, metal powder, electrically conductive ceramic powder, and combinations thereof.

16. The composite circuit protection device of claim 1, wherein said voltage-dependent resistor layer is made from a metal-oxide material.

17. The composite circuit protection device of claim 1, further comprising an encapsulant enclosing said PPTC component, said voltage-dependent resistor, and a part of said first conductive lead and a part of said second conductive lead.

18. The composite circuit protection device of claim 17, wherein said encapsulant is made from epoxy resin.

* * * * *